United States Patent [19]
Lee

[11] Patent Number: 5,942,825
[45] Date of Patent: Aug. 24, 1999

[54] ELECTRIC MOTOR HAVING ROTOR SHAFT ROTATABLY SUPPORTED ON A BEARING BY VERTICALLY ADJUSTABLE MAGNETS

[75] Inventor: Chang-Woo Lee, Kyungki-Do, Rep. of Korea

[73] Assignee: Samsung Electronics Co., LTD., Suwon, Japan

[21] Appl. No.: 08/984,659

[22] Filed: Dec. 3, 1997

[30] Foreign Application Priority Data

Dec. 4, 1996 [KR] Rep. of Korea ................. 96-45593 U

[51] Int. Cl.[6] .............................. H02K 7/09; F16C 39/06; F16C 32/04
[52] U.S. Cl. ......................................... 310/90.5; 310/90.5
[58] Field of Search ............................................... 310/90.5

[56] References Cited

U.S. PATENT DOCUMENTS 4,726,640  2/1988  Iwana et al. ............................. 350/6.8

FOREIGN PATENT DOCUMENTS 4-078315  3/1992  Japan ..................................... 310/90.5
6-067112  3/1994  Japan ..................................... 310/90.5
8-014255  1/1996  Japan ..................................... 310/90.5

*Primary Examiner*—Nestor Ramirez
*Assistant Examiner*—K. Imayoshi Tamai
*Attorney, Agent, or Firm*—Burns, Doane, Swecker & Mathis, L.L.P.

[57] ABSTRACT

An electric motor having a rotor and stator includes a magnetic hollow rotating shaft to which the rotor is fixed. A magnetic cylindrical bearing is inserted into the magnetic hollow rotating shaft such that a radial repulsive force is generated between the magnetic hollow rotating shaft and the magnetic bearing. A first fixed magnetic member is disposed at a top of the magnetic cylindrical bearing, and a rotating magnetic member is disposed at a top of the magnetic hollow rotating shaft such that the magnetic hollow rotating shaft can be supported by axial repulsive force generated between those magnetic members. The magnetic members are vertically adjustable for varying the axial clearance therebetween.

2 Claims, 4 Drawing Sheets

ELECTRIC MOTOR HAVING ROTOR SHAFT ROTATABLY SUPPORTED ON A BEARING BY VERTICALLY ADJUSTABLE MAGNETS

BACKGROUND OF THE INVENTION

(1) Field of the Invention

The present invention relates to a motor, and more particularly, to a motor in which a predetermined clearance is maintained between a bearing and a shaft by a magnetic field.

(2) Description of Related Art

Small motors are used in electronic products such as hard-disc drives in computers, laser beam scanners and laser printers. Bearings are used in these motors that simultaneously support load in both the radial and axial directions to make rotation of a rotor of the motor smooth.

With regard to the laser beam printer, laser beams are used to perform the printing operation. That is, a scanned image is formed on a photosensitive drum, which is responsive to light, by radiating the laser beams thereon. A rotating multi-faceted mirror system is provided to move the beams at a uniform velocity such that the beams are aligned on the photosensitive drum in an axial direction thereon.

Referring to FIG. 1, there is shown a sectional view illustrating an internal structure of a rotating multi-faceted mirror system. As shown in the drawing, the rotating multi-faceted mirror system 10 comprises a housing 11 inside of which is disposed a motor 20. A hole 11a is formed in a side of the housing 11, and a multi-faceted mirror 12 which reflects beams onto a photosensitive drum 103 (see FIG. 2) is exposed through the hole 11a. The motor 20 rotatably supporting the multi-faceted mirror 12 comprises a stator 21 and a rotor 22, the rotor 22 electromagnetically cooperating with the stator 21. The rotor 22 and the multifaceted mirror 12 are fixed on a rotating shaft 23. A bearing 25 inserted into the rotating shaft 23 is mounted on the central portion of the housing 11 so as to rotatably support the rotating shaft 23. To generate dynamic pressure between the bearing and the rotating shaft 23, a plurality of herringbone grooves 25a are formed on an outer circumference of the bearing 25. Disposed on a top of the rotating shaft 23 is an upper member 24 facing the upper end of the bearing 25. There is also formed a spiral groove 24 on a lower surface of the upper member 24 so that dynamic pressure can be generated between the upper member 24 and the bearing 25.

However, the prior art hemispherical bearing structured as described above has a drawback in that the manufacturing process is complicated. Namely, the grooves are formed at a predetermined depth using an etching process. Because many steps are needed in the process to manufacture the bearing, overall manufacturing costs are increased.

Further, when the rotor rotates on the bearing, dynamic pressure functions as a lubricant between the bearing and the rotor. However, since the amount of the clearance between the bearing and rotor is minuscule, the dynamic pressure is affected by even a small aberration. Therefore, measuring the clearance between the bearing and the rotating shaft is required, causing manufacturing costs to increase by the additional step required.

SUMMARY OF THE INVENTION

The present invention has been made in an effort to solve the above problems.

It is an object of the present invention to provide a motor which can maintain a predetermined clearance between a bearing and a rotating shaft by forming a magnetic field therebetween.

It is another object of the present invention to provide a motor which can adjust a distance between magnets in accordance with load applied to the bearing.

To achieve the above objects, the present invention provides a motor comprising rotor and stator; a magnetic hollow rotating shaft to which the rotor is fixed; a magnetic cylindrical bearing inserted into the magnetic hollow rotating shaft such that radial repulsive force is generated between the magnetic hollow rotating shaft and the magnetic bearing; a first fixed magnetic member disposed at a top of said magnetic cylindrical bearing; and a rotating magnetic member disposed at a top of the magnetic hollow rotating shaft such that the magnetic hollow rotating shaft can be supported by the bearing, the rotating magnetic member facing a first fixed magnetic member such that repulsive force is generated therebetween. The motor preferably comprises means for adjusting a clearance between the first fixed magnetic member and the rotating magnetic member.

According to one aspect of the present invention, the adjusting means is realized by a screw-coupling of a first fixed magnetic member and rotating magnetic member on the magnetic cylindrical bearing and hollow rotating shaft, respectively.

According to another aspect of the present invention, a cross-shaped groove is formed on the respective first fixed magnetic member and rotating magnetic member for receiving a turning tool.

According to still another aspect of the present invention, the magnetic hollow rotating shaft and magnetic cylindrical bearing are received in a housing having an upper member on which a second fixed magnetic member is inserted facing the rotating magnetic member such that axial repulsive force is generated therebetween.

Preferably, said second fixed magnetic member is screwed into the upper member so that a clearance between said second fixed magnetic member and rotating magnetic member can be adjusted.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

A preferred embodiment of the present invention will now be described in detail with reference to the accompanying drawings.

Figure 1:
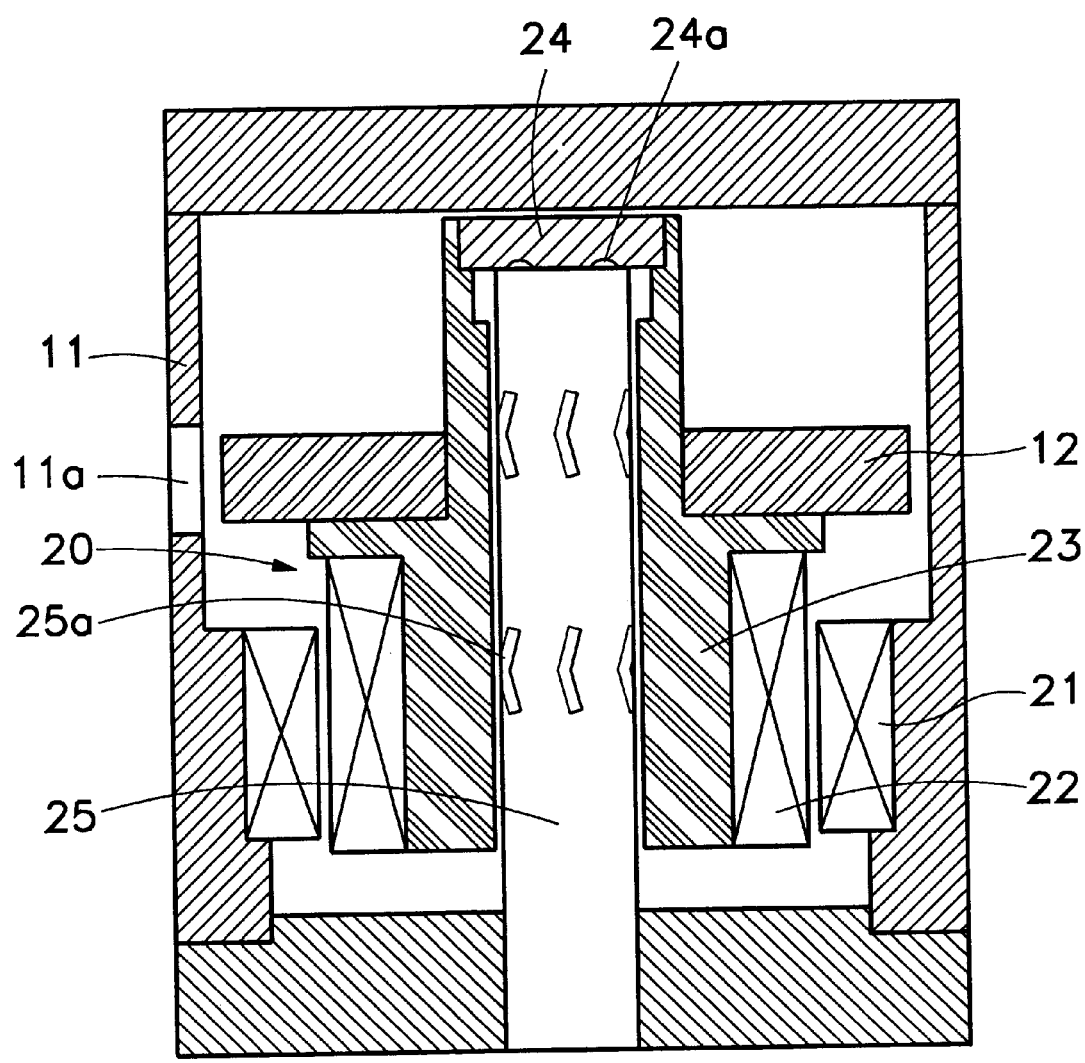
FIG. 1 is a vertical sectional view of a prior art rotating multi-faceted mirror system.
Figure 2:
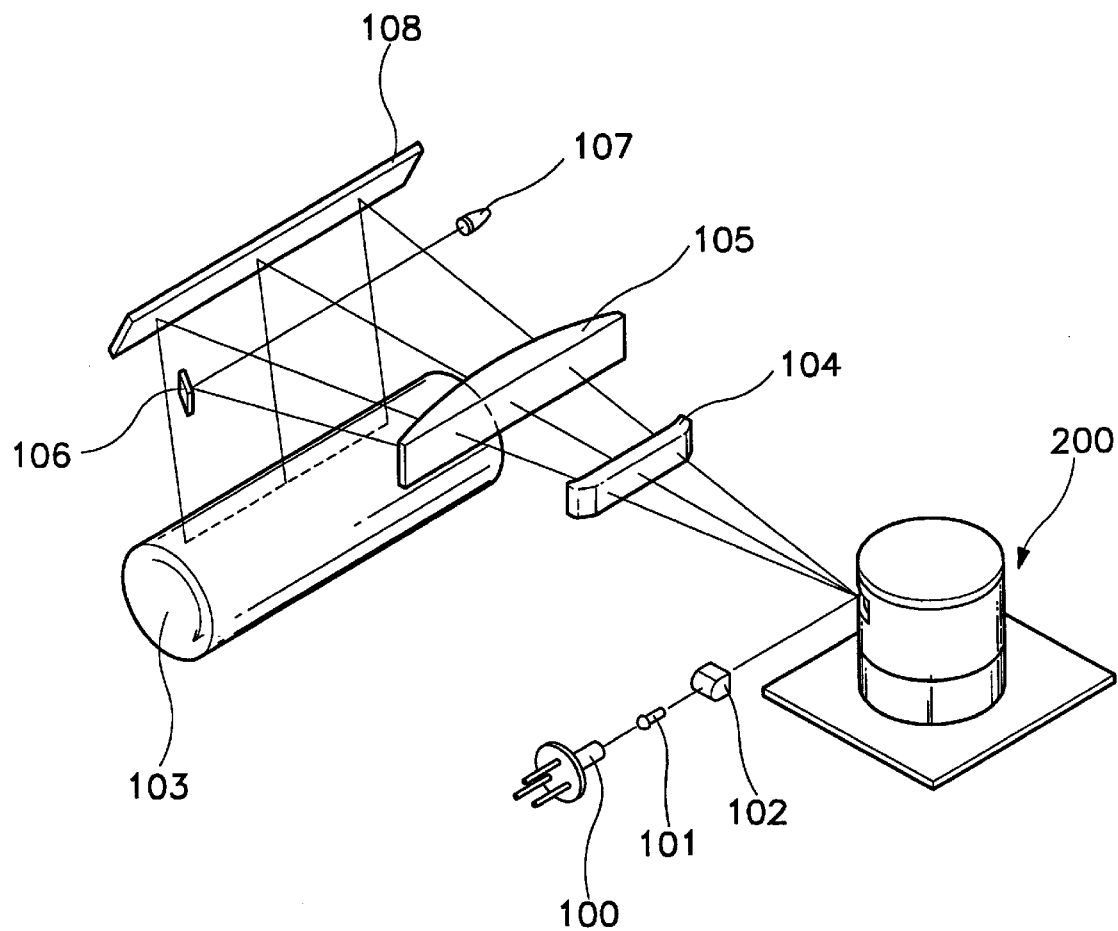
FIG. 2 is a schematic view of a conventional laser beam printer using a rotating multi-faceted mirror system where a motor according to a preferred embodiment could be employed.

Referring to FIG. 2, there is shown a schematic view of a laser beam printer using a rotating multi-faceted mirror system in which the present invention can be used.

As shown in FIG. 2, the laser beam printer comprises a semiconductor laser 100 and a collimate lens 101 for converting light from the semiconductor laser 100 into laser beams. The laser beam printer further comprises a rotating multi-faceted mirror system 200 for converting the laser beams into a fan beam, and a cylindrical lens 102 disposed between the multi-faceted mirror system 200 and the collimate lens 101.

There is provided a photosensitive drum 103 for recording a print information pattern using beams radiated from the cylindrical lens 102 via the multi-faceted mirror system 200. Disposed between the multi-faceted mirror system 200 and the photosensitive drum 103, in order, are a spherical lens 104, a toric lens 105, a horizontal synchronizing lens 106, a detecting sensor 107, and a reflector 108.

Beams are radiated toward the photosensitive drum 103 at a uniform velocity by the multi-faceted mirror system 200, pass through the spherical lens 104 to be focused on the photosensitive drum 103, and are reflected onto desired positions on the photosensitive drum 103 by the reflector 108. Further, the horizontal synchronizing lens 106 and the detecting sensor 107 are used to ensure that the beams are radiated at equal horizontal positions on the photosensitive drum 103.

As stated above, light radiated from the semiconductor laser 100 passes through the collimate lens 101 to be converted into laser beams. These laser beams pass through the cylindrical lens 102 to be positioned parallel to one another. Perpendicular laser beams are condensed in the multi-faceted mirror system 200, while the horizontal laser beams are converted into a fan beam.

The laser beams are radiated from the multi-faceted mirror system 200 at a uniform velocity, such that they are at equal positions relative to an axial direction of the photosensitive drum 103, then pass through the toric lens 105 to be focused by the same. The laser beams are then reflected to a desired position on the photosensitive drum 103 by the reflector 108. Here, beams that are off course are reflected by the horizontal synchronizing lens 106 to be input into the detecting sensor 107 such that the laser beams are positioned correctly on the photosensitive drum 103.

Figure 3:
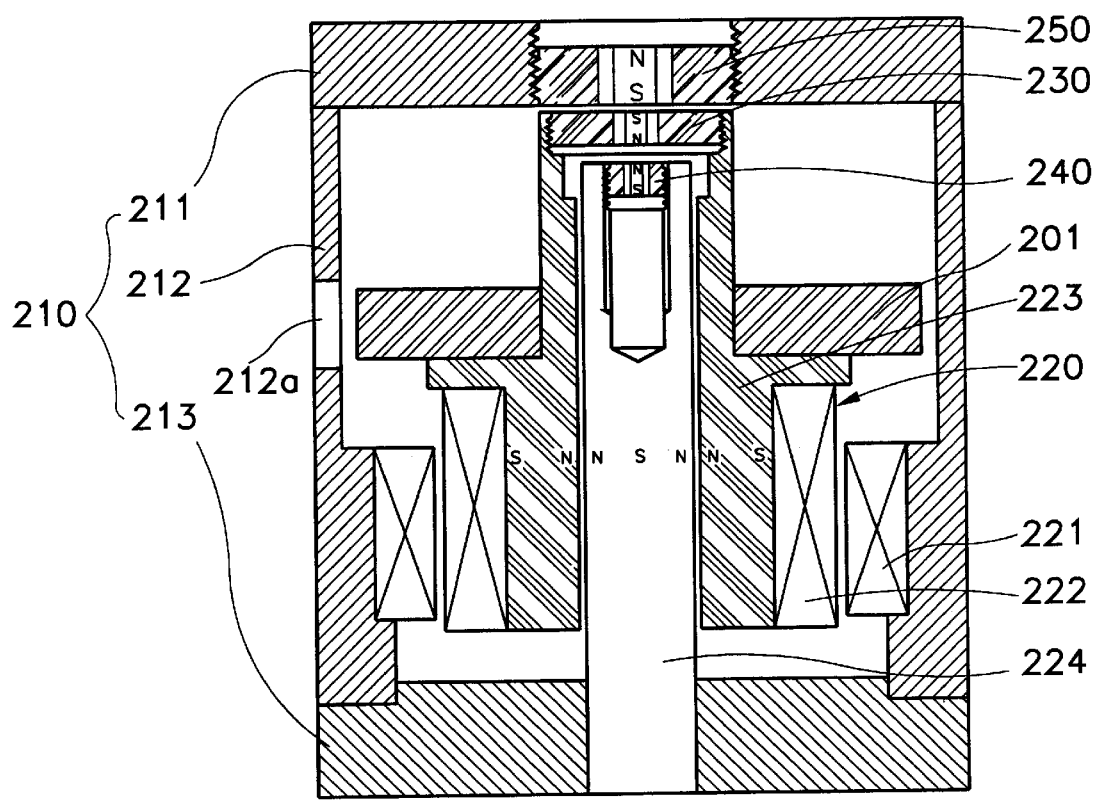
FIG. 3 is a vertical sectional view of a rotating multi-faceted mirror system where a motor according to a preferred embodiment of the present invention is employed.

Referring to FIG. 3, there is shown a vertical sectional view of a rotating multi-faceted mirror system.

As shown in FIG. 3, the rotating multi-faceted mirror system 200 includes a housing 210 for receiving a multi-faceted mirror 201 and a motor 220.

The housing 210 comprises a cylindrical member 212 having opened upper and lower ends and upper and lower members 211 and 213 for closing the opened upper and lower ends, respectively. Formed on the cylindrical member 212 is a hole 212a through which the multi faceted mirror 201 reflects the laser beam to the photosensitive drum 103. The motor 220 is mounted inside the housing 210 such that it can rotatably support the multi-faceted mirror 201.

The motor 220 comprises a stator 221 fixed on an inner circumference of the cylindrical member 212 and a rotor 222 electromagnetically cooperating with the stator 221. The rotor 222 is disposed around a hollow rotating shaft 223 having the same axis as that of the cylindrical member 212. That is, the multi-faceted mirror 201 is disposed around the hollow rotating shaft 223, and the rotor is disposed around the hollow rotating shaft 223 under the multi-faceted mirror 201.

In addition, a bearing 224 is inserted into the hollow rotating shaft 223 to rotatably support the same. The bearing 224 is fixed on a central portion of the lower member 213 and has a cylindrical outer surface facing a cylindrical inner surface of the hollow rotating shaft 223. A rotating magnetic member 230 is screwed into the top of the hollow rotating shaft 223 such that the rotating shaft 223 is supported on the bearing 224 by the rotating magnetic member 230. Screwed into the top of the bearing 224 is a first fixed magnetic member 240 facing the rotating magnetic member 230. A second fixed magnetic member 250 is screwed into the upper member 211 of the housing such that it faces the rotating magnetic member 230 (see FIG. 4).

In the present invention as described above, to ensure lubrication between the bearing 224 and the rotating shaft 223, the motor 220 is designed to form a magnetic field between the bearing and the rotating shaft 223 to reduce friction generated therebetween. That is, both the bearing 224 and the rotating shaft 223 are made of a magnetic material such that repulsive force is produced therebetween, thereby maintaining a predetermined clearance therebetween. For example, the bearing 224 is designed to have its S-pole at its center portion and its N-pole at its outer circumferential outer portion, while the rotating shaft 223 is designed to have its N-pole at its inner circumference opposing the outer circumference of the bearing having the N-pole and to have its S-pole at its outer circumference. Accordingly, since the opposing surfaces of the bearing 224 and the rotating shaft 223 have the same pole, a predetermined radial clearance is maintained between the rotating shaft 223 and the bearing 224 by repulsive force.

In addition, the rotating magnetic member 230 and the first fixed magnetic member 240 are also disposed such that opposing surfaces thereof have the same pole, thereby producing repulsive axial force therebetween. Further, the rotating magnetic member 230 and the second fixed magnetic member 250 are also disposed such that opposing surfaces thereof have the same pole, thereby producing repulsive axial force therebetween.

Particularly, in the present invention, there is provided clearance adjusting means for adjusting clearances between the rotating magnetic member 230 and the first and second fixed magnetic members 250 and 240.

Figure 4:
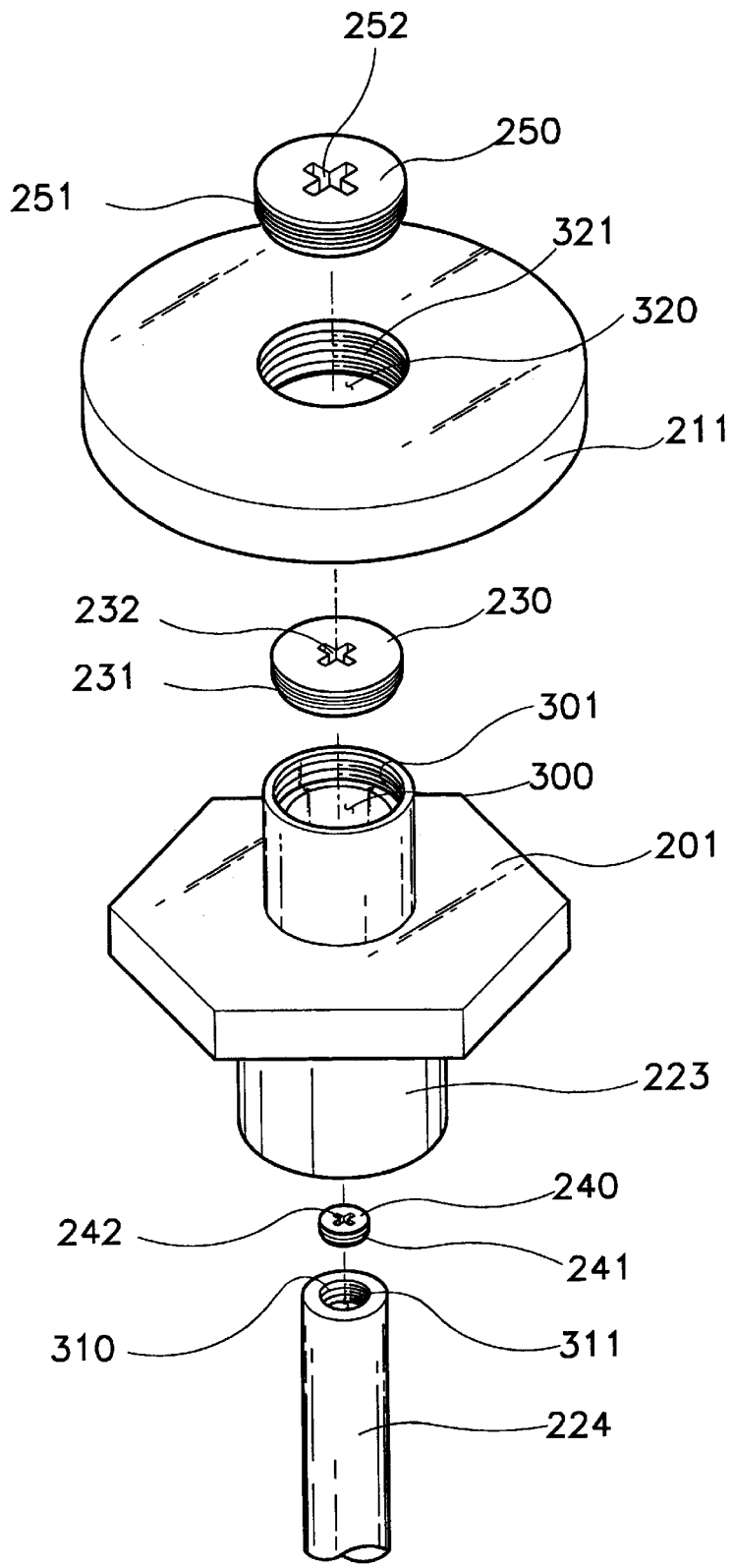
FIG. 4 is an exploded perspective view illustrating a major portion of the rotating multi-faceted mirror in FIG. 3.

That is, as shown in FIG. 4, by raising or lowering the magnetic members 230, 240 and 250, the clearances therebetween can be adjusted in accordance with loads applied to the magnetic members.

Describing more in detail, the rotating shaft 223, the bearing 224, and the upper member 211 are provided with vertically aligned first (intermediate), second (lower), and third (upper) inserting holes 300, 310, and 320, respectively, into which the magnetic members 230, 240 and 250 are inserted. Further, first, second, and third female thread portions 301, 311 and 321 are formed on inner circumferences of the first, second and third inserting holes 300, 310 and 320, respectively. First, second and third male thread portions 231, 241 and 251 are formed on the outer circumferences of the rotating magnetic member 230, and the first and second magnetic members 240 and 250, respectively. The intermediate hole 300 is of larger diameter than the lower hole 310, and the upper hole 320 is of larger diameter than the intermediate hole.

Therefore, by screwing the male thread portions 231, 241 and 251 to the female thread portions 301, 311 and 321, the clearances between the magnetic members 230, 240 and 250 can be adjusted in accordance with loads acting in the axial direction.

In addition, by forming pitches of the thread portions with minute dimensions, the clearances can be more precisely adjusted.

To make it easy to adjust the clearances, cross-shaped first, second and third adjusting grooves 232, 242 and 252 are formed on the magnetic members 230, 240 and 250, respectively, for receiving a turning tool.

In the motor structured as described above, it is possible to form radial and axial spaces between the rotating shaft and the bearing by forming magnetic fields, so it is not necessary to form grooves on the bearing, thereby making it easy to manufacturing the motor and decreasing the manufacturing costs.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An electrical motor comprising:

a housing having an upper member in which an internally threaded upper hole is formed;

an externally threaded upper magnet threadedly mounted in the internal thread of the upper hole and including a tool-receiving recess facing upwardly for enabling the upper magnet to be rotated and vertically adjusted by a manual tool;

a magnetic cylindrical bearing disposed in the housing, the bearing being stationary and extending vertically to define a vertical axis, an upper end of the bearing having an internally threaded lower hole formed therein;

an externally threaded lower magnet threadedly mounted in the internal thread of the lower hole and including a tool-receiving recess facing upwardly for enabling the lower magnet to be rotated and vertically adjusted by a manual tool;

a stator disposed in the housing in radially outwardly spaced relationship to the bearing;

a rotor mounted on the bearing for being rotated relative thereto by a stator, the rotor including a magnetic hollow rotary shaft inserted onto the bearing such that a radial repulsive force is generated between the shaft and the bearing, an upper end of the shaft having an internally threaded intermediate hole;

an externally threaded intermediate magnet threadedly mounted in the internal thread of the intermediate hole and including a tool-receiving recess facing upwardly for enabling the intermediate magnet to be rotated and vertically adjusted by a manual tool;

the upper hole, the lower hole, and the intermediate hole being vertically aligned with one another;

the intermediate hole being of larger diameter than the lower hole, and the upper hole being of larger diameter than the intermediate hole.

2. An electrical motor comprising:

a rotor and a stator;

a magnetic hollow rotating shaft affixed to the rotor;

a magnetic cylindrical bearing inserted into the magnetic hollow rotating shaft such that radial repulsive force is generated between the magnetic hollow rotating shaft and the magnetic bearing;

a first fixed magnetic member inserted disposed at a top of the magnetic cylindrical bearing;

a rotary magnetic member disposed at a top of the magnetic hollow rotating shaft and facing the first fixed magnetic member to generate a magnetic repulsive force therebetween for supporting the magnetic hollow rotating shaft on the bearing;

means for adjusting an axial clearance between the first fixed magnetic member and the rotating magnetic member, the adjusting means comprising screw thread couplings of the first fixed magnetic member and the rotating magnetic member, respectively, wherein a cross-shaped grooves is formed on each of the fixed magnetic member and the rotating magnetic member and is adapted to receive a turning tool, a housing in which the magnetic hollow rotating shaft and the magnetic cylindrical bearing are received, the housing having an upper member on which a second fixed magnetic member is disposed facing the rotating magnetic member for generating an axial repulsive force therebetween, the second fixed magnetic member being screw-coupled on the upper member so that a clearance between the second fixed magnetic member and the rotating magnetic member can be adjusted, wherein a cross-shaped groove is formed on the fixed magnetic member and is adapted to receive a turning tool.

\* \* \* \* \*